(12) United States Patent
Travagli et al.

(10) Patent No.: US 11,226,269 B2
(45) Date of Patent: Jan. 18, 2022

(54) DEVICE, SYSTEM AND METHOD FOR DIRECT SAMPLING A LIQUID OF A TANK

(71) Applicants: Furio Travagli, Genoa (IT); Riccardo Matulli, Genoa (IT)

(72) Inventors: Furio Travagli, Genoa (IT); Riccardo Matulli, Genoa (IT)

( * ) Notice: Subject to any disclaimer, the term of this patent is extended or adjusted under 35 U.S.C. 154(b) by 30 days.

(21) Appl. No.: 16/605,059

(22) PCT Filed: Apr. 24, 2018

(86) PCT No.: PCT/EP2018/000217
§ 371 (c)(1),
(2) Date: Oct. 14, 2019

(87) PCT Pub. No.: WO2018/197040
PCT Pub. Date: Nov. 1, 2018

(65) Prior Publication Data
US 2021/0131919 A1    May 6, 2021

(30) Foreign Application Priority Data
Apr. 26, 2017  (EP) .................................... 17000716

(51) Int. Cl.
*G01N 1/16*      (2006.01)
*G01N 1/14*      (2006.01)
*G01N 1/20*      (2006.01)

(52) U.S. Cl.
CPC ................. *G01N 1/16* (2013.01); *G01N 1/14* (2013.01); *G01N 1/2035* (2013.01); *G01N 2001/2071* (2013.01)

(58) Field of Classification Search
CPC .......... G01N 1/16; G01N 1/2035; G01N 1/14; G01N 2001/2071; G01N 1/20; G01N 2001/1418; G01N 2001/1427
USPC ... 73/64.56, 863.01, 863.31, 863.33, 863.83, 73/863.84, 864.34, 864.35, 864.81; 134/113, 22.1, 22.11, 22.12, 166 R, 134/169 R, 169 C, 171, 166 C
See application file for complete search history.

(56) References Cited

U.S. PATENT DOCUMENTS

| | | | |
|---|---|---|---|
| 4,165,643 A * | 8/1979 | Moll .................... | G01N 33/146 73/863.11 |
| 4,380,176 A * | 4/1983 | Bauer ...................... | G01N 1/10 73/863.86 |
| 4,413,533 A | 11/1983 | Diesel | |
| 2005/0087027 A1 | 4/2005 | Widmer | |
| 2013/0239666 A1* | 9/2013 | Carpenter ............ | G01N 1/4005 73/61.72 |

* cited by examiner

*Primary Examiner* — Robert R Raevis
(74) *Attorney, Agent, or Firm* — Eandi Fitzpatrick LLP

(57) ABSTRACT

Direct tank liquid sampling device (1) comprising a plurality of inlet lines (2) to supply a liquid of a liquid tank stock (3) to a main collector (7); a pump (4) configured to circulate a collected liquid in the device (1); a packing section (6); a main piping (19, 20, 21) fluidly coupling the main collector (7) and the packing section (6) for supplying the packing section (6) with a portion of said collected liquid; an in-line measuring instrument (5) fluidly coupled to the main piping ((19, 20, 21) in an intermediate position between the main collector (7) and the packing section (6), said in-line measuring instrument (5) being configured for measuring one or more of the following liquid parameters: density, viscosity, temperature, electrical conductivity, or sulphur content.

13 Claims, 2 Drawing Sheets

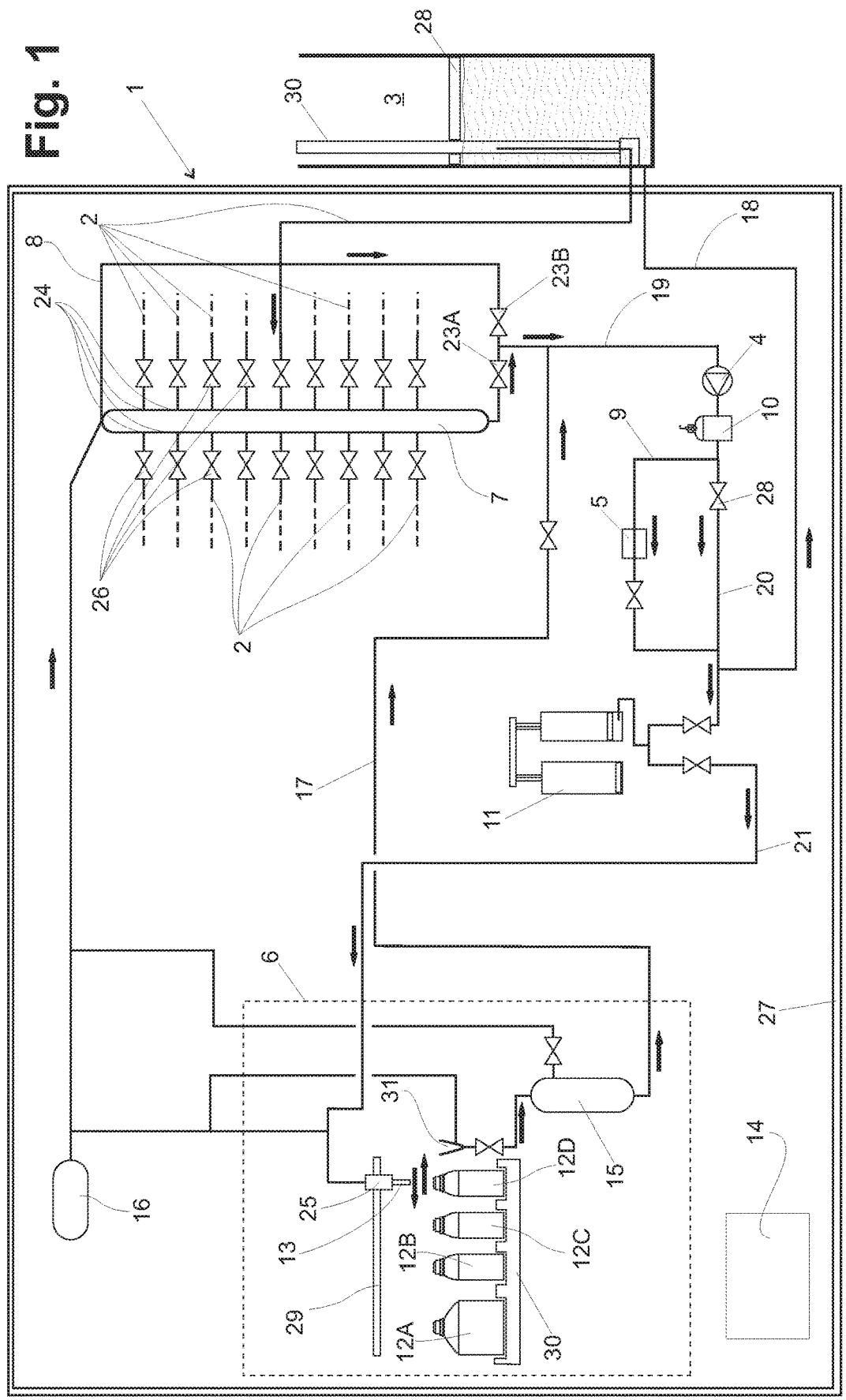

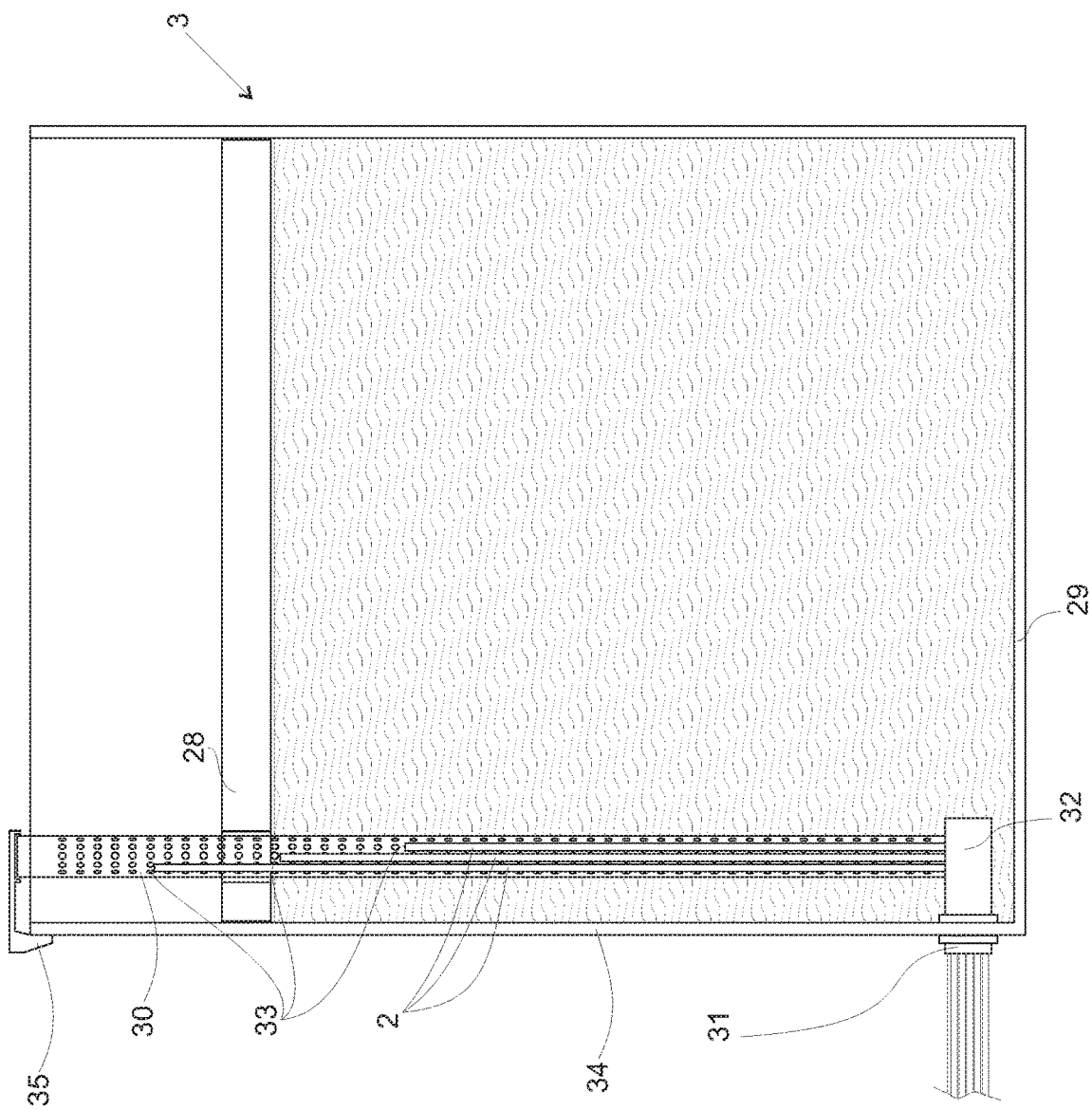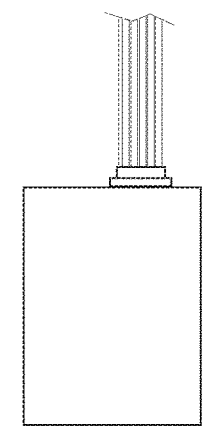

DEVICE, SYSTEM AND METHOD FOR DIRECT SAMPLING A LIQUID OF A TANK

TECHNICAL FIELD

The present invention relates to a system for sampling and analysing a portion of liquid, preferably a hydrocarbon or a chemical substance, collected from a tank, preferably a big tank stock like those for stocking the mineral oils or the intermediate products of an oil refinery or petrochemical plant. In particular, the present invention relates to a system for collecting a predetermined quantity of liquid, for enabling analyses on a sample of the liquid itself, and for performing these activities safely and without the manual intervention of an operator.

The present invention further relates to a method for operating, sampling and cleaning the system itself.

Background Art

Traditionally a sample in a tank is collected manually by means of a sampling bottle, thus a metallic vessel provided with a cord that is lowered directly in the inner of the tank for performing the collection.

This manual process has been in the time gone automatized and simplified by means of systems collecting the liquid directly from the tank.

These systems suffer of the inconvenient that tend to get blocked and dirty in the conjunction area of the piping with the tank wall, and further do not guarantee the required representativity of the collected samples.

Direct sampling systems from a tank which are easy to be maintained, reliable over time and able to guarantee the representativity of the collected sample are not available in the state of the art.

A further problem is the possibility to operate such activities without a direct contact with the product to be collected, and without the presence of an operator in the tank area, which is normally dangerous for the human health and safety.

SUMMARY

The above mentioned disadvantages of the background art are now solved by a direct tank liquid sampling device according to a first scope of the present invention. Said device comprising a plurality of inlet lines to supply a liquid of a liquid tank stock to a main collector; a pump configured to circulate a collected liquid in the device; a packing section for packing a portion of the collected liquid; a main piping, fluidly coupling the main collector and the packing section, for supplying the packing section with a portion of said collected liquid; an in-line measuring instrument fluidly coupled to the main piping, in an intermediate position between the main collector and the packing section, for measuring one or more of the following liquid parameters: density, viscosity, temperature, electrical conductivity, or sulphur content.

Advantageously said sampling device allows to sample in continuous a liquid contained in a tank stock without the operator intervention.

In this way, the risk for the operator of falling in the tank or to breathe dangerous volatile substances, like benzene or Sulphur dioxide is avoided.

The sampled products are generally oil or petrochemical products like: crude oil, oil, gasoline, diesel, kerosene, jet fuel, fuel oil, naphtha, virgin naphtha, and in general all products coming from the oil refining, included the petrochemical products. The present invention is also applicable to alimentary liquids, like olive oil or wine.

Advantageously said device allows the analysis in continuous of predetermined parameters indicative of the liquid quality of the collected liquid.

A second scope of the present invention is a liquid sampling system comprising a direct tank liquid sampling device according to the first scope of the present invention, a liquid tank stock, and a surge pipe arranged vertically in the liquid tank stock and containing at least a portion of the inlet lines of the sampling device.

Said system, thanks to the surge pipe, allows to collect the liquid of the tank at a suitable distance from the internal wall of the tank and at several heights of the same. The representativity of the collected sample is guaranteed, because the sample is not collected close to the internal wall of the tank.

Furthermore, thanks to this characteristic, the block of inlet lines with dirty contained over the surface of the internal walls of the tank is avoided. Finally, the surge pipe protects the bundle of inlet pipes from great turbulences that can be generated during the mix and treatment activities of the product.

A third scope of the present invention is a method for direct sampling a liquid comprising the steps of:
supplying a main collector with the liquid of a liquid stock tank by means of a plurality of inlet lines;
pumping the collected liquid towards a packing section;
selectively measuring one or more of the following parameters of the collected liquid before the liquid enters the packing section: density, viscosity, temperature, electrical conductivity, or sulphur content;
packing the collected liquid into at least one removable container in the packing section.

A fourth scope of the present invention is a monitoring plant of a group of tanks comprising a plurality of liquid sampling systems according to the second scope of the present invention and a centralized control unit. Said centralized control unit being configured to dialog and recover information from the local control units of direct tank liquid sampling devices.

According to the present description, the term tank or stock tank means a cylindrical vessel, raising vertical above ground, having a height comprised between 10 and 24 meters and a diameter comprised between 5 and 40 meters.

These and other advantages will appear in more detail from the detailed description, in the following, of non-limiting embodiments with reference to annexed drawings.

DESCRIPTION OF DRAWINGS

In the drawings:
FIG. 1 shows a schematic view of a device according to the present invention;
FIG. 2 shows a schematic view of a system according to the present invention and a section of a stock tank wherein a surge pipe is installed.

DETAILED DESCRIPTION

The following description of one or more preferred embodiments refers to the attached drawings.

The same reference numbers in different drawings identify the same or similar elements.

The scope of the invention is defined in the annexed claims.

The various technical details, structures and characteristics of the following embodiments can be combined or interchanged in any appropriate manner.

To comprehend the inventive concept of the present solution reference can be done to FIG. 1, wherein the arrangement of the device according to the present invention is shown.

In particular, a tank stock 3 is connected through a bundle of inlet lines 2, described in detail below in the text and in the FIG. 2, to a main collector 7. Said bundle of inlet lines 2 supply the main collector 7 with portions of liquid collected a various heights in the tank 3.

Each inlet lines is connected to the main collector 7 through an its own dedicated inlet 24. To each inlet 24 and each inlet line 2 corresponds a predetermined height of sampling in the tank 3.

Normally, the liquid is collected each meter of height. Since the oil stock tanks normally have variable diameters but height of about 20 meters, with an inner effective height of about 18 meters, the liquid is collected at one meter from the bottom of the tank 3, and again, meter by meter, up to reach the eighteenth meter of height from the bottom.

In this example, the sampling points of liquid in the tank are eighteen and consequently the inlet lines 2 are eighteen too, like the inlet 24 of the inlet lines 2 in the main collector 7. Depending on the liquid head in the tank 3, some sampling points can be immersed in the liquid and other no.

Each inlet line 2 is provided with an its own valve 26 which is automatically controlled for permitting or preventing the introduction of liquid in the main collector 7.

If one of the valves 26 is opened, a height from which the liquid is collected from the tank 3 is selected.

Then the liquid flows in the inlet line 2 dedicated to the specific selected height and enters in the main collector 7.

The liquid flows into the main collector 7 because the liquid head in the tank 3 is normally situated higher than the main collector 7, thus the liquid reaches for gravity the main collector 7. For facilitating this outflow, the main collector 7 can be conveniently depressurized. When the distance between the device 1 and the tank 3 is excessive, one or more pumps can pump the liquid from the tank 3 to the main collector 7.

When the valve 26 is open, the main collector 7 is filled with the liquid corresponding to the sampling height selected.

The main collector 7 is configured to contain a quantity of collected liquid sufficient to fill the containers 12 and to perform all the online measurements required.

The main collector 7, as shown in FIG. 1, can be a rectilinear conduit, arranged in vertical with respect to the ground, fluidly connected to a plurality of inlet lines 2. Said inlet points 24 can be arranged at various heights of the rectilinear conduit and on both sides of the same, as represented in FIG. 1.

Said main collector 7 can comprise, integral therewith, a semicircular shaped pipe 8 which connects opposite sides of the main collector 7 to form part of the main collected 7. In particular, when the main collector 7 is a rectilinear conduit, the semicircular shaped pipe 8 connects the lower end with the upper end of the rectilinear conduit. The ring so realized, thus the group constituted by the main collector 7 and the semicircular shaped pipe 8, is fluidly connected to a first portion of the main piping 19, which in turn connects said ring to the pump 4.

Said ring comprises two valves 23A, 23B arranged along the semicircular shaped pipe 8, respectively upstream and downstream with respect to the main collector 7, as shown in FIG. 1. Acting the pump 4 and opening or closing one valve 23A or the other valve 23B, the liquid in the main collector 7 can be circulated in one sense and in the opposite sense of flowing along said ring. Specifically, acting the pump 4, opening the valve 23A and closing the valve 23B, the main collector 7 can be emptied from the bottom and the lower half of said ring can be washed with the liquid of the main collector 7. On the contrary, acting the pump 4, closing the valve 23A and opening the valve 23B, the main collector 7 can be emptied from the top and the upper half of said ring can be washed with the liquid of the main collector 7.

This washing procedure of said ring allows to eliminate the traces of the sample previously collected from the ring. For example, if the first phase of a portion of liquid is collected from the tank 3 through the inlet line 2 corresponding to the height of 3 meters, which is rich of impurities due to the fact that is close to the bottom of the tank, the subsequent portion of collected liquid is used to eliminate/reduce the traces of the previous portion of collected liquid and to clean the ring. If the new portion of liquid is collected through the inlet line 2 corresponding to the height of 12 meters, this new portion is circulated in said ring until it can be considered washed. Normally it's enough a single washing cycle of the ring, circulating the new collected liquid in one sense of flowing and in the opposite sense. Sometime it can be required two or more washing cycles.

The portion of liquid used for washing is then re-sent in the tank 3 by means of the pump 4 and a return-pipe 18.

As already indicated, the main collector 7 can be depressed opening one of the two valves 23A or 23B, acting the pump 4 and closing the valve 26 arranged on the inlet lines 2.

Normally the samples from the tank 3 are collected one by one and between one and the other a washing cycle of the main collector 7 is performed.

The second portion of the main piping, indicated by the number 20, is arranged downstream the pump 4. Along said portion 20 can be arranged a degaser 10 to collect the liquid and decant it in order to remove the gas within it. Said gas can accumulate in the liquid due to the turbulences generated by the pump 4. Internally to the degaser 10 the liquid is maintained with an almost constant level for guaranteeing a great discharge of gas from the liquid. The liquid is collected by the bottom of the degaser 10 for obtaining a flat liquid.

Along the portion 20 of the main piping or on a parallel pipe 9 of said portion is arranged the in-line measuring instrument 5. The parallel pipe 9 branches from the portion 20 of the main piping downstream the pump 4 and/or the degaser 10, and rejoins the same downstream a valve 28 arranged on the portion 20. In this way the in-line measuring instrument 5 can be bypassed if necessary, for example in case of maintenance.

The in-line measuring instrument 5 can be fluidly connected to the main piping 20 in a direct manner or, alternatively, through the parallel pipe 9.

The in-line measuring instrument 5 can be configured to measure one or more of the following parameters of the liquid: density, viscosity, temperature, electrical conductivity, or sulphur content.

This instrument allows to perform a characterization of the portion of the liquid collected. This characterization allows to operate choices on the subsequent treatments, for example the refinement on the liquid of the tank 3.

In particular, a prompt analysis of the density allows to qualify the liquid, while, a comparison of the on time density at more than one levels allows to evaluate the homogeneity degree of the liquid contained in the tank. Depending on the liquid contained in the tank, measurements on the temperature, viscosity, electrical conductivity and sulphur content can be used to qualify the liquid in the tank.

The measurement performed by the instrument 5 is an in-line measurement, thus a direct measurement on the liquid that is flowing in the pipeline and it's performed in continuous.

For the reason, in-line instruments of density, viscosity, temperature, electrical conductivity or sulphur content can be employed and for this reason no further details of them are here provided. Downstream the in-line measuring instrument 5 a return-pipe 18 branches and connects the main piping 20 to the tank 3, permitting to send back the sampled liquid to the tank 3.

The most downstream portion 20 of the main piping can be connected to a dosimeter 11. The dosimeter 11 allows to collect a predetermined quantity of liquid from the main piping 20, for example 1 liter.

This predetermined quantity of liquid can be then delivered to the packing section 6 through a further portion of the main piping, indicated with the reference 21. Said portion 21 couples the dosimeter 11 to the packing section 6.

The packing section 6 allows to purge the collected liquid into one or more removable container 12.

In particular, the packing section 6 comprises a dispensing head 13 configured to selectively purge the liquid received by the main collector 7, in particular by the dosimeter 11.

The dispensing head 13 is installed on a carriage 25 movably connected to a rail 29. The movement system of said carriage 25 is preferably of pneumatic type, for avoiding electric devices in a zone at elevated risk of explosion and for satisfying the ATEX regulations: the rule 2014/34/UE, which is directed to the manufacturer of equipments intended for use in potentially explosive atmospheres, and the rule 99/92/CE, for the safe and safety of workers in explosive atmospheres.

The carriage 25 is configured to move between predetermined positions corresponding to dispensing points. Positioning the removable containers 12 in predetermined positions defined by a rack 30, the mouth of the containers 12 is in correspondence of said predetermined positions of the carriage 25. Being the container 12 and the dispensing head 13 vertically aligned, the liquid dispensed by means of the dispensing head 13 falls in the removable container 12.

In an alternative version of the invention, the vertical alignment of dispensing head 13 and the container 12 is realized maintaining rest the dispensing head 13, while the rack 30 moves horizontally, moving the container 12 with respect to the dispensing head 13.

When the dosimeter 11 is a pneumatic cylinder configured for sucking a predetermined quantity of liquid and successively pumping the same quantity, the liquid can be delivered to the head 13 by the dosimeter 11 itself. Alternatively, the action of the pump 4 allows the dispensing of liquid from the dispensing head 13.

The removable containers 12 can be three bottles made of metal 12B, 12C, 12C, 12D with a capacity of 1 liter each one, like those typically used for sampling of oil products, and a bigger container 12A. The bigger container 12A has a capacity which is able to contain as much samples as the number of inlet lines from the tank 3. For example, in the above mentioned case, the collecting levels are eighteen and so the collectable samples through the inlet lines 2 are eighteen. In this case, the bigger container 12A can have a capacity of 18 liters if the dosimeter has a capacity of 1 liter. The collection of all levels of tank 3 allows to obtain a complete sampling of the liquid of tank 3. Furthermore, the sampling of all levels allows to perform analysis in continuous on the collected liquid, being the container removable and transportable to a laboratory.

The containers 12, filled of the collected liquid of the tank 3, can be closed by means of a closure apparatus (not shown). Said closure apparatus places a cap over the container 12 for avoiding the contamination or the evaporation of the collected liquid. Said apparatus can comprise a rotary cylinder pneumatically acted, preliminary equipped with preformed or adhesive caps. The cylinder rotates and places the caps on the mouth of the container 12.

Alternatively said removable containers 12 can be closed with a rubber cork.

Before a subsequent dispensing the main piping and the conduits of the packing section 6 are washed with the following washing process:
  the carriage 25 is positioned in a further position that vertically corresponds to a collecting point 31 fluidly connected to a sloop container;
  a portion of the new collected liquid is dispensed through the dispensing head 13 for washing the pipes of traces of previously dispensed liquid;
  the dispensed portion is collected in the sloop container 15 which periodically is emptied sending back the collected liquid to the tank 3.

After the steps of the washing process, the dispensing head 13 can be purged with a jet of compressed gas, preferably nitrogen.

When the dispensing head 13 is cleaned by the traces of previously dispensed liquid, the collected liquid can be dispensed through the dispensing head 13 in one of the removable containers 12.

The sloop container 15 is fluidly connected to the pump 4 by means of a pipe 17 and part of the main piping 19. From the pump 4, the sloop container 15 is also fluidly connected to the tank 3 by means of a portion of the main piping 20 and the return-pipe 18.

Acting the pump 4 and opening/closing specific valves arranged along the cited pipes, the sloop container 15 can be emptied in the tank 3.

The device 1 can further comprise a gas distribution system 16 of compressed gas.

Said distribution system 16 comprises a source of gas, for example a cylinder or a gas distribution grid. Said gas can be air, nitrogen or other inert gas. The under pressure gas of said distribution system 16 can be used for one or more of the following activities: purge the dispensing head 13, make inert the sloop container 15, empty and clean the main collector 7. The distribution system 16 can be fluidly connected to one or more of the following elements: packing section 6, sloop container 15, collecting point 31, main collector 7.

The device 1 according to the present invention can be contained in a container 27 configured to be transportable. Said container 27 is opened on more sides for allowing the recirculation of air and avoiding to accumulate explosive gasses. For further applications, different from oil and petrochemical, the container 27 can be closed, provided that is ventilated.

Said container 27 further protects the elements arranged inside it. Said container 27 is configured to contain the device 1 and only a portion of the inlet lines 2 which are mainly arranged outside the container 27 to connect the tank 3, which is arranged far from the device 1.

The electric controls of the sampling device 1 are contained in a framework compliant with ATEX rules for avoiding deflagration risks.

Finally the device 1 according to the present invention can comprise a local control unit 14 suitable for controlling the valves, the measurement instruments 5, the packing section 6, electromechanical or pneumatic actuators of the device 1, and all other elements.

Said local control unit 14 can be an autonomous programmable device. Said control unit can comprise one or more hardware and/or software components configured to call, decode, execute, archive, analyze, share, evaluate and/or categorize information. In particular, said control unit 14 can comprise a processor, an archiving means, a memory, an in/out module, a communication interface and a human-machine interface (not shown).

The processor is configured to execute the instructions contained in the memory. Said memory can comprise a program executable by said processor. Said processor and said memory are furthermore configured to send/receive data through said in/out module and/or said communication interface. The communication interface can be of the type wireless. The interface man-machine allows the interaction between the operator and the local control unit 14 for displaying the collected data and for entering the control instructions for the device 1.

A further scope of the present invention is represented by a liquid sampling system comprising a direct tank liquid sampling device 1 according to the first scope of the present invention, a liquid tank stock 3, a surge pipe 30 arranged vertically in the liquid tank stock 3 and containing at least a portion of inlet lines 2 of the sampling device 1.

With reference to FIG. 2 is schematically shown a section of the tank 3 and in particular its inner portion, wherein a surge pipe 30 is vertically arranged.

Said surge pipe 30 is configured to contain an initial portion of each inlet line 2 of the sampling device 1. The inlet lines 2 are arranged in parallel, in the surge pipe 30, to form a bundle of pipes. Each inlet line 2 comprises an inlet end 33 through which the liquid of the tank 3 can enter and can be transported to the sampling device 1. That ends of the inlet lines 2 are arranged into the surge pipe 30.

Said surge pipe 30 can be a pipe having a holed wall, through which the liquid of the tank 3 can flow. Said surge pipe 30 has a height which is substantially equal to that of the tank 3. The liquid in the surge pipe 3 is quite and can be collected with the inlet lines 2.

Said bundle of pipes 30 maintains its vertical position by means of a lower support 32 arranged close to the bottom 29 of the tank 3, by means of a pass through hole on the floating roof 28 of the tank 3 and by means of a upper support 35 anchored to the external wall 34 of the tank 3.

The surge pipe 30 is installed at a distance that is more than 500 mm, preferably more than 750 mm, from the inner surface of the tank, to avoid that impurities of the wall are sucked.

A feedthrough element 31 allows the exit of the bundle of pipes of inlet lines 2 from the inner to the outer of the tank 3. Said feedthrough element 31 is configured so that the tight of the tank 3 is guaranteed.

The pipe bundle came out of the tank 3 can be connected to the sampling device 1 above described. In particular, each inlet line 2 of the pipe bundle is connected to the main collector 7 by means of dedicated inlets 24.

The system so conceived allows a direct sampling of the liquid of the tank stock 3.

A further scope of the present invention is represented by a sampling method for direct sampling a liquid, for example a hydrocarbon or a petrochemical product, comprising the steps of:
- supplying a main collector 7 with the liquid coming from a liquid stock tank 3 by means of a plurality of inlet lines 2;
- pumping the collected liquid towards a packing section 6;
- selectively measuring one or more of the following parameters of the collected liquid before the liquid enters the packing section 6: density, viscosity, temperature, electrical conductivity, or sulphur content;
- packing the collected liquid into at least one removable container 12A, 12B, 12C, 12D in the packing section 6.

In particular, to avoid contamination of the new collected sample with the previously collected sample, before a subsequent packing phase, a first washing phase of the main collector 7 is performed. Said washing can be performed circulating a first portion of the new sample of collected liquid. The method uses the new sample, thus the subsequent in timing, for washing the main collector 7 of traces of the previous sample collected.

A similar operation can be performed in the packing section 6. A second washing phase, with a second portion of the new sample of collected liquid, can be performed circulating the new sample on the packing section 6.

A last scope of the present invention is a monitoring plant (not shown) of a group of tanks comprising a plurality of liquid sampling systems according to the second scope of the present invention and a central control unit.

Said group of tanks can comprise a plurality of tank stocks 3, each one fluidly connected with the respective sampling device 1.

Said monitoring plant can comprise a central control unit connected to local control units 14 of the direct tank liquid sampling devices 1. Said central control unit allows to remotely and centrally control the devices 1. In a particular embodiment, said central control unit can be installed in a control room of the plant wherein the tanks 3 are installed. Said plant can be for example a refinery plant or a petrochemical plant.

Each tank 3 is thus equipped with its own sampling system which allows to automatically act the valves, the pumps, the electromechanical actuators, and all other elements of said sampling devices 1.

Said monitoring plant allows to remotely operate the devices 1 for programming the collections at different heights in the various tanks 3 of the tanks park. Said plant further allows to remotely monitor the physical parameters of the liquid contained in the tanks 3, so to determine and fix the subsequent manufacturing processes for the liquid.

To conclude, it is clear that the invention so conceived can be susceptible of various modifications and variations, all covered by the scope of the invention; furthermore all the details are replaceable by technically equivalent elements. In practice, the materials used and the dimensions may be any according to the technical requirements.

Finally, here-below are described some advantageous embodiments:
- Method for direct sampling a liquid comprising the steps of:
  - supplying a main collector 7 with the liquid of a liquid stock tank 3 by means of a plurality of inlet lines 2;
  - pumping the collected liquid towards a packing section 6;
  - selectively measuring one or more of the following parameters of the collected liquid before the liquid enters the packing section 6: density, viscosity, temperature, electrical conductivity, or sulphur content;
packing the collected liquid into at least one removable container 12A, 12B, 12C, 12D in the packing section 6.

Method for direct sampling a liquid according to the previous embodiment, wherein before a subsequent phase of packing a first cleaning phase of the main collector 7 with a first portion of a subsequent collected liquid sample occurs.

Method for direct sampling a liquid according to one of the two previous embodiments, further comprising a second cleaning phase of the packing section 6 with a second portion of the subsequent collected liquid sample.

Device, system or method according to present invention, wherein said liquid is hydrocarbon or a chemical product.

Monitoring plant of a group of tanks comprising a plurality of liquid sampling systems according to the present invention and a central control unit connected to local control units 14 of the direct tank liquid sampling devices 1.

The invention claimed is:

1. A direct tank liquid sampling device comprising:
a plurality of inlet lines to supply a liquid of a liquid tank stock to a main collector;
a pump configured to circulate the collected liquid in the device;
a packing section;
a main piping fluidly coupling the main collector and the packing section for supplying the packing section with a portion of said collected liquid;
an in-line measuring instrument fluidly coupled to the main piping in an intermediate position between the main collector and the packing section said in-line measuring instrument being configured for measuring one or more of the following liquid parameters: density, viscosity, temperature, electrical conductivity, or sulphur content;
wherein the inlet lines collect the liquid of the liquid tank stock at predetermined heights which are different each other.

2. The direct tank liquid sampling device according to claim 1, wherein said in-line measuring instrument is arranged along said main piping or along a parallel piping fluidly coupled to the main piping.

3. The direct tank liquid sampling device according to claim 1, wherein the main collector is fluidly coupled to the pump through a semi-ring shaped pipe connecting the bottom to the top of the main collector so that a portion of the collected liquid can be circulated in the main collector by means of the pump and acting two valves arranged along the semi-ring shaped pipe, respectively upstream and downstream the main collector.

4. The direct tank liquid sampling device according to claim 1, further comprising a degasser arranged along the main piping downstream the pump.

5. The direct tank liquid sampling device according to claim 1, further comprising a dosimeter arranged along the main piping upstream the packing section.

6. The direct tank liquid sampling device according to claim 1, wherein the packing section comprises:
at least one removable container to be filled;
a dispensing head configured to selectively pour the liquid received from the main collector;
a carriage configured to move the dispensing head with respect to the at least one removable container so to align the dispensing head with a mouth of said at least one removable container during the pouring.

7. The direct tank liquid sampling device according to claim 6, wherein the packing section further comprises a sloop container wherein the dispensing head pours a portion of liquid between subsequent dispensing phases so to eliminate eventual traces of a previous pouring.

8. The direct tank liquid sampling device according to claim 7, wherein the sloop container is fluidly connected to the inlet of the pump through a by-pass piping.

9. The direct tank liquid sampling device according to claim 1, further comprising a return-pipe fluidly connected to the main piping and configured to flow-back the collected liquid from the device to the liquid stock tank.

10. The direct tank liquid sampling device according to claim 1, further comprising a distribution system of nitrogen or air compressed configured to purge the dispensing head and/or to the main collector and/or to the sloop container.

11. The direct tank liquid sampling device according to claim 1, wherein the sampling device is configured to be transportable.

12. A liquid sampling system comprising:
a direct tank liquid sampling device comprising
a plurality of inlet lines to supply a liquid of a liquid tank stock to a main collector;
a pump configured to circulate the collected liquid in the device;
a packing section;
a main piping fluidly coupling the main collector and the packing section for supplying the packing section with a portion of said collected liquid;
an in-line measuring instrument fluidly coupled to the main piping in an intermediate position between the main collector and the packing section, said in-line measuring instrument being configured for measuring one or more of the following liquid parameters: density, viscosity, temperature, electrical conductivity, or sulphur content; a liquid tank stock;
a surge pipe arranged vertically in the liquid tank stock and containing at least a portion of the inlet lines of the sampling device;
wherein the surge pipe comprises a perforated pipe wherein the inlet lines are arranged so that their ends are positioned at different heights of the tank and are fluidly in contact with the liquid contained in the tank.

13. The liquid sampling system according to claim 12, wherein the surge pipe is positioned at least 500 mm from the internal wall of the liquid tank stock.

* * * * *